Feb. 16, 1932.   R. LEE   1,845,298
EXERCISING MACHINE
Filed Aug. 15, 1929
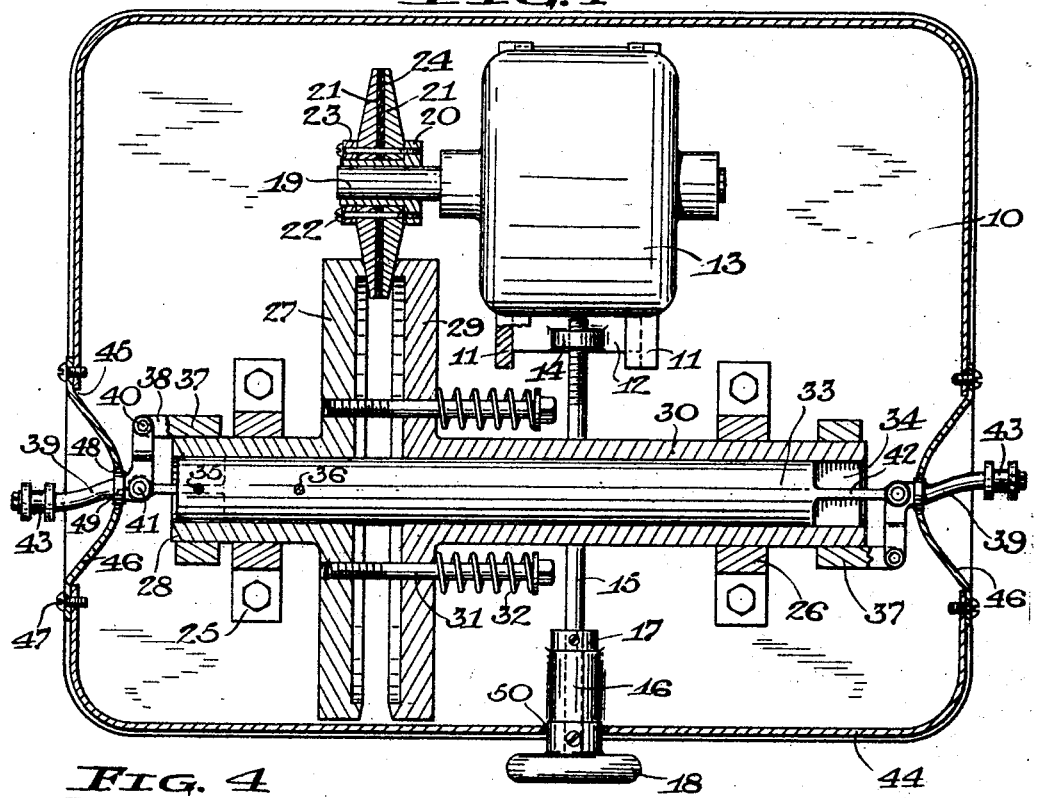
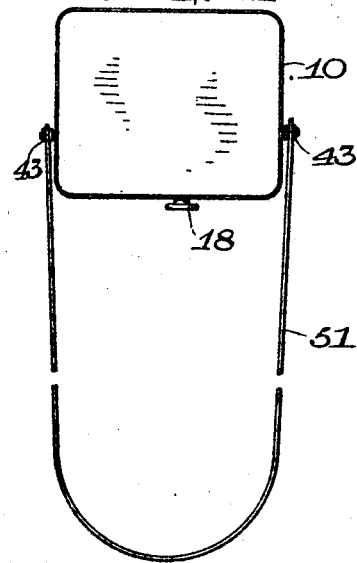
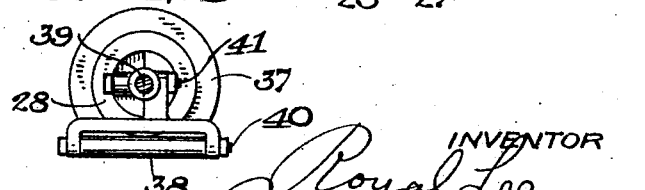

Patented Feb. 16, 1932

1,845,298

UNITED STATES PATENT OFFICE

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN

EXERCISING MACHINE

Application filed August 15, 1929. Serial No. 386,116.

The invention relates to variable-speed mechanisms and more particularly to exercising machines.

An object of the invention is to provide a simple but effective variable-speed exercising machine of the type employing a reciprocating body-engaging band.

Another object of the invention is to provide a variable stroke for the body-engaging band and to automatically vary the stroke upon a change in the frequency of vibration.

A further object of the invention is to provide an exercising machine embodying a variable-speed friction drive including a pair of co-axial friction wheels receiving between them a tapered friction disk for urging said friction wheels apart upon a change of speed ratio, there being crank members operatively connected with the friction wheels and having the amplitude of their strokes controlled by the friction wheels.

A further object is to provide simple casing means for the exercising machine of a character which will facilitate assembly and guard the working parts.

The invention further consists in the several features hereinafter set forth and more particularly defined by the annexed claims.

In the accompanying drawings, Fig. 1 is a sectional plan view of an exercising machine embodying the invention;

Fig. 2 is a fragmentary detail sectional elevation of one end portion of the variable-speed rotor;

Fig. 3 is an end view of the rotor, parts being broken away and parts being shown in section, and Fig. 4 is a top plan view of the exercising machine and its co-operating body-engaging band.

In these drawings, the numeral 10 designates a base plate on which are mounted a pair of spaced guideways 11 slidably receiving therein the base 12 of an electric motor 13. The motor base 12 is provided with a lug 14 in which is threaded one end portion of a rod 15, the other end portion of the rod being journalled in a lug 16 upstanding from the base plate 10. The rod 15 is confined against axial movement in the lug 16 by means of a collar 17 and a hand wheel 18 which latter serves to rotate the rod for adjusting the position of the motor 13 in the guideways 11.

The shaft 19 of the motor carries thereon a flanged bushing 20 on which are mounted a pair of friction disks 21 secured in position by clamping screws 22 passing through the disks as well as through a clamping ring 23 and the flanged portion of the bushing 20. The friction disks 21 converge outwardly and are formed of suitable material such as fibre, bakelite, or impregnated fabric. A disk of resilient material 24, such as rubber, is interposed between the two friction disks 21 and may be cemented thereto, if desired. The resilient disk or sheet 24 may be conveniently formed of sponge rubber in order to permit the rubber to flow when placed under pressure. As another expedient, the sheet may be formed of solid rubber which is perforated or recessed. In some instances an imperforate sheet of rubber may be used and the inner faces of the adjacent friction disks may be recessed to permit the flow of rubber.

A pair of spaced pedestals 25 and 26 are secured to the base plate 10 and are provided with co-axial bearing bores. A friction wheel 27 has an elongated tubular hub portion 28 which is journalled in the pedestal 25, and a friction wheel 29 is provided with an elongated tubular hub 30 which is journalled in the pedestal 26, the friction wheels 27 and 29 being arranged in spaced co-axial relation to receive between them at their peripheries the assembled friction disks 21. Bolts 31 are threaded into the friction wheel 27 in parallel relation to the axis of the wheel and slidably pass through the friction wheel 29, coiled compression springs 32 being carried on the bolts for urging the friction wheels toward each other and into engagement with the interposed friction disks 21. The friction faces of the friction wheels are relatively narrow and are sloped to fit the friction disks.

The axial positions of the friction wheels 27 and 29 are preferably determined by the friction wheels 21 which latter are limited in their axial movement, although, if desired, one of the friction wheels may be restrained against axial movement and the friction wheels 21 permitted to float along their axis.

A pair of complementary half-round shaft members 33 and 34 are disposed within the tubular hub portions of the friction wheels and abut flatwise in relatively slidable relation to form a cylindrical shaft, which fits closely within these hub portions to align the friction wheels. The shaft member 33 is fixedly secured by screws 35 and 36 to the hub portion of the friction wheel 27 and the shaft member 34 is fixedly secured to the hub portion of the friction wheel 29 in a similar manner. Each screw 35 also secures in place a collar member 37 which surrounds the hub portion of the friction wheel into which the screw is threaded and each collar member includes a projection 38 extending beyond the end of the hub portion. The projections 38 of the two collar members are arranged at diametrically opposite points with respect to the axis of the friction wheels. A pair of angle-shaped levers 39 are disposed at opposite ends of the friction wheel assembly and each is provided with a forked end which is pivotally mounted, as by means of a pivot pin 40, on the projection 38 of the collar member 37. The elbow portion of each lever 39 is arranged adjacent the axis of the friction wheel assembly and is pivotally connected, as by means of a pivot bolt 41, to a flat reduced end portion 42 of one of the shaft members 33 and 34, the lever at the other end of the friction wheel assembly being secured to the other shaft member in a similar manner. The free end portion of each lever 39 projects outwardly from the end of the shaft assembly and is provided with a spool-shaped member 43 at its end which may be either fixedly or rotatably mounted on the lever. The spool-shaped members 43 are arranged eccentrically with respect to the axis of the friction wheel assembly, and are disposed on opposite sides of this axis.

A casing 44 is mounted on the base plate to enclose the friction wheel assembly and its driving motor and is provided at its opposite end walls with large circular openings 45 in axial alignment with the friction wheel assembly. Dished plates 46 are provided to cover the large openings 45 and are detachably secured to the casing 44, as by means of screws 47. Each plate 46 is provided with a relatively small central opening 48 within which loosely fits a circular rib 49 formed on the lever 39 passing through the plate, the rib 49 being disposed close to the pivot member 41 in order to permit the use of small clearance. The circular rib 49 is substantially concentric with the axis of the friction wheel assembly at a point when the spool shaped member 43 is approximately midway between its extreme positions with respect to such axis. The casing 44 is also provided with an opening 50 for admitting the hand wheel 18. By the use of the large openings at the opposite ends of the casing 44, the casing can be conveniently slipped over the projecting levers 39 without using separable end walls or extending the openings to the bottom edge of the casing. The dished plates 46 require only a relatively small operating clearance about the inner portions of the levers 39, thus preventing injury to fingers or other objects in proximity to the levers. The outer end of each lever need project only a small distance beyond the plane of the end wall, which further increases the safety of operation.

As shown in Fig. 4, the device is intended to be used with a flexible body-engaging belt or strap 51, the ends of which are secured to the free ends of the levers 39. The belt or strap 51 may be of conventional construction including the usual keyhole-shaped apertures at its ends for detachable engagement with the spool-shaped members 43.

In operation, the belt or strap 51 is placed about the body of the user and the electric motor 13 is started in rotation. The friction disks 21 on the motor shaft are in frictional engagement with the friction wheels 27 and 29 and thus serve to rotate the friction wheel assembly at a speed determined by the position of the friction disks with respect to the axis of the friction wheels. The levers 39 operatively connected with the ends of the friction wheels serve as crank pins which reciprocate the attached belt or strap 51. When it is desired to vary the frequency of vibration, the hand wheel 18 is turned to bring the electric motor 13 into different positions with respect to the axis of the friction wheel assembly. When the friction wheels 21 on the motor shaft are moved toward the axis of the friction wheel assembly, the friction wheels 27 and 29 are urged apart to engage wider portions of the friction disk 21 at a region closer to the axis of the motor shaft, and when the motor shaft is moved away from the axis of the friction wheel assembly, the friction wheels 27 and 29 are urged closer together by the coiled springs 32. The former adjustment provides a lower operating speed for the friction wheel assembly, while the latter provides a higher operating speed. Simultaneously with the urging apart of the friction wheels 27 and 29 incident to a reduction in operating speed, the relative movement of the half-round shaft members 33 and 34 serves to draw the levers inwardly toward the hub portions of the friction wheels, thus displacing the spool-shaped members 43 outwardly from the axis of the friction wheel assembly and increasing the working stroke. Conversely, upon an increase of operating speed the spool-shaped members are moved closer to the axis to reduce the stroke. The stroke is thus automatically decreased upon an increase in operating speed and increased upon a decrease in operating speed, which is found desirable in practice not only to secure the best operating characteristics for the belt or strap 51 but also to avoid overloading of the motor. Because of the resilient character of the end portions 42 of the shaft members 33 and 34, there is no tendency toward binding at the pivot pins 41 and the use of an unduly loose fit at the pivotal connections is avoided. The construction of the variable speed drive is such that the machine is relatively quiet in operation, and power is transmitted at a high efficiency.

While the mechanism of the present invention is more particularly intended for use in an exercising machine, it will be obvious that it is also capable of use in other applications requiring a variation in stroke upon a change in operating speed.

What I claim as new and desire to secure by Letters Patent is:

1. In a variable-speed mechanism, the combination of a rotary driving member, a rotary friction element carried on said driving member, a pair of spaced co-axially disposed friction elements engaging said first-named friction element, and adjustable-throw crank members each operatively connected with said co-axial friction elements.

2. In a variable-speed mechanism, the combination of a rotary driving member, a disk-shaped friction element carried on said rotary driving member and converging outwardly, a pair of co-axially disposed rotary friction elements urged into engagement with the opposite sides of said first-named friction element to be driven by said friction element and said co-axially disposed friction elements being mounted for movement apart, means for projecting said first-named friction element between said co-axially disposed friction elements for urging them apart and for effecting a change in driving ratio between them, crank elements operatively connected with said co-axially disposed friction elements, and means controlled by the relative positions of said co-axially disposed friction elements for determining the stroke of said crank elements.

3. In a variable-speed mechanism, the combination of a rotary driving member, a disk-shaped friction element carried on said rotary driving member and converging outwardly, a pair of co-axially disposed friction wheels urged into engagement with the opposite sides of said friction element to be driven by said friction element and said co-axially disposed friction wheels being mounted for movement apart and each having a tubular hub portion, means for projecting said friction element between said co-axially disposed friction wheels for urging them apart and for effecting a change in driving ratio between said friction element and said friction wheels, crank members pivotally mounted on the respective hub portions of said friction wheels, and means extending within said hub portions for connecting each crank member with the other friction wheel to change the stroke of said crank members upon a change in the distance apart of said friction wheels.

4. In a variable-speed mechanism, the combination of a rotary driving member, a disk-shaped friction element carried on said rotary driving member and converging outwardly, a pair of co-axially disposed friction wheels urged into engagement with the opposite sides of said friction element to be driven by said friction element and said co-axially disposed friction wheels being mounted for movement apart and each having a tubular hub portion, means for projecting said friction element between said co-axially disposed friction wheels for urging them apart and for effecting a change in driving ratio between said friction element and said friction wheels, crank members pivotally mounted on the respective hub portions of said friction wheels, and a pair of complementary overlying shaft members disposed within said hub portions to form a shaft therewithin and each shaft member being secured to a respective friction wheel, the end portions of said shaft members having respective connections with said crank members for increasing the throw of said crank members upon an increase in the axial spacing of said friction wheels.

5. In a variable-speed mechanism, the combination of a rotary driving member, a disk-shaped friction element carried on said rotary driving member and converging outwardly, a pair of co-axially disposed friction wheels urged into engagement with the opposite sides of said friction element to be driven by said friction element and said co-axially disposed friction wheels being mounted for movement apart, and each having a tubular hub portion, means for projecting said friction element between said co-axially disposed friction wheels for urging them apart and for effecting a change in driving ratio between said friction element and said friction wheels, crank members pivotally mounted on the respective hub portions of said friction wheels, and a pair of complementary overlying shaft members disposed within said hub portions to form a shaft therewithin and each shaft member having a reduced integral extension pivotally connected to the adjacent crank member for increasing the throw of said crank members upon an increase in the axial spacing of said friction wheels.

6. The combination of a base, a rotor mounted on said base, a pair of crank members carried on the opposite end portions of said rotor, a casing mounted on said base and including opposite walls having openings receiving said crank members therethrough, and dished plates covering said openings and having apertures receiving said crank members therethrough at regions spaced inwardly from the planes of said opposite casing walls.

7. The combination of a base, a rotor mounted on said base, a pair of crank members pivotally carried on the opposite end portions of said rotor, means for adjusting said crank members to provide a variable stroke, a casing mounted on said base and including opposite walls having openings receiving said crank members therethrough, and dished plates covering said openings and having substantially central apertures receiving said crank members therethrough at regions spaced inwardly from the planes of said opposite casing walls.

8. The combination of a rotary member having an axial opening, an angle-shaped lever having one end portion pivotally mounted on said rotary member and having its free end portion projecting outwardly from the end of said rotary member to form a crank, and an adjusting member extending within the axial opening of said rotary member and having a pivotal connection with an intermediate portion of said lever for changing the angular position of said lever about its pivotal mounting and thereby changing the stroke of the crank-forming free end portion of said lever.

9. The combination of a rotary member having an axial opening, a collar secured about said rotary member and having a part projecting from the end of said rotary member, an angle-shaped lever having one end portion pivotally mounted on the projecting part of said collar and having its free end portion projecting outwardly from the end of said rotary member to form a crank, and an adjusting member extending within the axial opening of said rotary member and having a pivotal connection with an intermediate portion of said lever for changing the angular position of said lever about its pivotal mounting and thereby changing the stroke of the crank-forming free end portion of said lever.

10. The combination of a support, a rotary member carried on said support, means for driving said rotary member, a crank member movably mounted on an end portion of said rotary member, and means for automatically changing the stroke of said crank member coincident with a change in the speed of said rotary member.

11. The combination of a support, a rotor carried on said support, a crank member pivotally carried on an end portion of said rotor for rotation therewith and having its pivotal axis arranged transversely of the axis of said rotor, said crank member having an arm projecting outwardly from said rotor and swingable about the pivotal axis of said crank member for varying the throw of said arm, and means for adjusting the throw of said crank member.

12. The combination of a support, a rotor carried on said support, a crank arm carried on said rotor and extending outwardly therefrom in divergent relation to the axis of said rotor, and a casing wall for said rotor having an apertured locally inwardly dished portion receiving said crank arm therethrough at a region spaced inwardly from the plane of said wall.

In testimony whereof, I affix my signature.
ROYAL LEE.